UNITED STATES PATENT OFFICE.

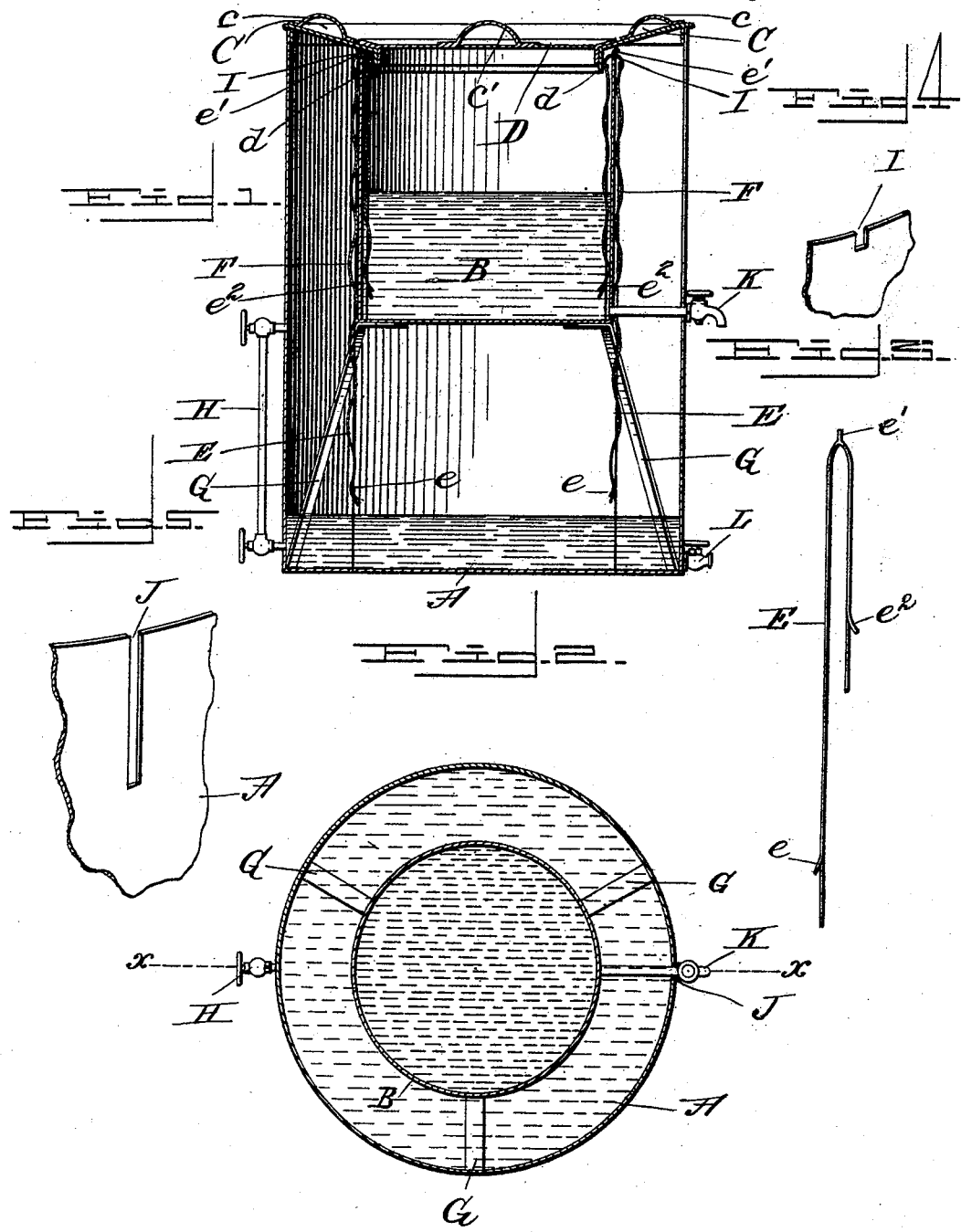

THOMAS GORDEN SORTOR, OF BAKER CITY, OREGON.

FILTER.

SPECIFICATION forming part of Letters Patent No. 497,354, dated May 16, 1893.

Application filed January 23, 1893. Serial No. 459,366. (No model.)

*To all whom it may concern:*

Be it known that I, THOMAS GORDEN SORTOR, a citizen of the United States, residing at Baker City, in the county of Baker and State of Oregon, have invented certain new and useful Improvements in Filters; and I do hereby declare the following to be a full, clear, and exact description of the invention, such as will enable others skilled in the art to which it appertains to make and use the same.

My invention relates to an apparatus for filtering and clarifying oils and other liquids, and it consists in the peculiar construction and arrangement of the several parts of the device which will be more fully hereinafter described and pointed out in the claims.

The object of my invention is to provide a device for the filtration and purification of oils in a crude state or oils which have been used for lubricating purposes to render them pure and free from grit and other foreign substances in order that they may again be used; and a further object is to provide a simple, inexpensive device, cheaply manufactured, and easily operated to filter liquids of all classes which require to be refined and clarified. I attain these objects by the device, illustrated in the accompanying drawings, wherein like letters of reference indicate similar parts in the several views, and in which—

Figure 1, is a sectional view in elevation of my improved filter. Fig. 2, is a top plan view of the same with covers removed for better illustration. Fig. 3, is a view of a frame to retain in place material used for siphoning liquids from one receptacle to another. Fig. 4, is a detail of a portion of the wall of the inner receptacle showing a slot in which a frame is placed and rests. Fig. 5, is a detail view of a portion of the wall of the outer receptacle showing a slot therein to permit a faucet to extend from the inner receptacle through the wall of the outer receptacle.

A, and B, represent the outer and inner receptacles respectively. The outer receptacle is of cylindrical form with a centrally apertured cover C of suitable form. Receptacle B is of similar smaller form having legs G attached to its bottom in order that a chamber will be formed under this receptacle when it is inserted to stand on the legs in the larger receptacle, as shown in Fig. 1. Cover C is provided with handles $c$, and depending portion $d$ of circular form to fit over the upper rim of the inner receptacle. When this cover is in position, it covers the space between the upper rims of the receptacles. Portion $d$ also serves to retain in position the frame upon which the material is placed, as will hereinafter appear.

D is a circular formed cover of well known form provided with a handle $c'$ to fit over the aperture in cover C to exclude foreign matter from the inner receptacle.

E are wire frames one end of each being bent back upon itself, see Fig. 3, each wire having downwardly projecting barbs near its ends and a barb on its bent portion.

F is porous or fibrous material, preferably batting, one end of a piece being attached to a lower barb $e$ on a frame E, and carried up over the barb $e'$ on the bent portion of the frame and the opposite end attached to the barb $e^2$ on the other extremity of the frame.

H is a water gage of ordinary form attached to the lower portion of the outer receptacle or can to indicate the amount of the filtered liquid contained in this receptacle.

I are slots cut at intervals in the upper rim of the inner receptacle to permit the insertion of the bent portion $e'$ of frames E to form a rest for the same.

J is a slot cut in the outer wall or casing, extending from the top downwardly to a point, at a distance equal to about one half the depth of the receptacle. This slot permits receptacle B, with faucet K attached, to be readily inserted in the outer receptacle, the faucet projecting through the slot by means of which the liquid in the receptacle to be filtered may, at any time, be drawn off before filtration. L is a similar faucet attached to receptacle A near its bottom for drawing off the filtered and clarified liquid.

The operation of the device is as follows: Covers C and D being removed from receptacle E, receptacle B is placed therein, as shown, faucet K extending through slot J in the wall of the larger receptacle. The liquid to be filtered is then poured into B, strips of batting or other suitable filtering material, are attached to frames E, as before described, and the frames placed in position, the batting extending from points near the bottom of receptacle B, through slots I to points on frames E near the bottom of the outer receptacle, covers C and E are then replaced, and by means of capillary attraction the liquid in the inner receptacle is siphoned through the batting over into receptacle A, at the same time being filtered and clarified, the sediment remaining in receptacle B. When the liquid in the inner receptacle has been exhausted, the covers may be removed, receptacle B lifted out, the sediment removed, and the operation repeated. The filtration is facilitated by means of the filtering material in the outer receptacle being in contact with the frames E which permits the liquid to run freely off from the batting.

It is evident that minor changes may be made in the construction of parts, for example, in the use of different material for the construction of my device, without departing from the spirit of my invention.

What I claim, and desire to secure by Letters Patent, is—

1. In a filter, the combination of a cylindrical receptacle provided with a circular apertured cover, a smaller cylindrical receptacle with legs G within and resting on the bottom of the first receptacle and having a faucet extending through a slot in the wall of the outer receptacle, a frame of U shape form, the bent portion thereof resting in a slot in the rim of the inner receptacle, and the ends thereof extending into the receptacles, batting on the frame, cover D for the aperture in cover C, and faucet L in the outer receptacle, substantially as described and set forth.

2. The combination in a filter of a cylindrical receptacle A, a smaller receptacle B with legs G, within the first receptacle, covers C and D for the receptacles, frame E extending from the inner receptacle, through slot I in the rim of the inner receptacle, to the bottom of the outer receptacle, batting F attached to barbs thereon, faucet K extending from the bottom of inner receptacle through a slot in the outer receptacle, faucet L in the receptacle A and gage H on the outer receptacle, as and for the purposes set forth.

In testimony whereof I affix my signature in presence of two witnesses.

THOMAS GORDEN SORTOR.

Witnesses:
  CHAS. NEBERGALL,
  GILES W. WELLER.